United States Patent Office 2,981,712
Patented Apr. 25, 1961

2,981,712
COATING COMPOSITIONS

Lee Richard Harper, Media, Pa., assignor to E. I. du Pont de Nemours and Company, Wilmington, Del., a corporation of Delaware No Drawing. Filed July 1, 1957, Ser. No. 668,844

1 Claim. (Cl. 260—32.8)

This invention relates to liquid coating compositions of the paint, enamel and varnish type, and more particularly to such compositions containing a particular class of polyurethane reaction product as the essential organic film-forming constituent.

Polyurethane polymers which are reaction products of polyesters and organic diisocyanates are known, as are liquid coating compositions containing such polymers in solution in a volatile organic solvent. Practically useful coating compositions of this type are commonly made by mixing solutions of two separately prepared and mutually reactive polymers immediately before the ultimate coating composition is to be used because the ultimate composition is unstable on storage due to the tendency to increase objectionably in viscosity and/or to gel in the container. Storage-stable single-package liquid coating compositions based on polyester-diisocyanate reaction products are needed for the convenience and economy they offer to both the manufacturer and the consumer mainly by means of having the one final composition made by the manufacturer in a directly useful form and having this form free of objectionable viscosity increase during storage.

The primary objective of this invention is to provide such storage-stable single-package coating compositions which have the desirable property of air-drying rapidly by solvent evaporation and by chemical reaction with water in the atmosphere when coating thereof are brushed, sprayed or otherwise applied to suitable substrates such as wood, metal, plaster walls, concrete floors, linoleum and the like. A further objective is to provide such compositions which also yield coatings having a desirable balance of properties including adhesion, hardness, toughness, flexibility, durability, wearability, and resistance to damage from water, oil, soap, and solvents like nail polish remover or clothing spot remover.

These objectives are accomplished by providing a stable, air-drying liquid organic coating composition consisting essentially of a solution in volatile organic solvent of a polyurethane reaction product of (a) 1 hydroxyl equivalent of polyester polymer having a molecular weight of about 500–3000, having an acid number of not more than 5 and containing an average of about 2–3 hydroxyl groups per molecule, (b) 0–1 hydroxyl equivalent of saturated aliphatic diol containing 2–6 carbon atoms per molecule, (c) 0–6 hydroxyl equivalents of saturated aliphatic triol containing 3–6 carbon atoms per molecule and (d) organic diisocyanate in an amount sufficient to provide 1.2–2.0 isocyanate groups for each hydroxyl group provided by components (a), (b), and (c), which reaction product is prepared in the presence of at least 0.003% by weight based on said diisocyanate of chlorine in the form of a compound which produces chloride ions and is acidic in water.

One hydroxyl equivalent is the number of parts by weight of a hydroxyl-containing compound which contains seventeen parts by weight of hydroxyl, i.e. contains one molar equivalent amount of hydroxyl.

The polyurethane reaction products specified above are prepared by reacting the components at any convenient temperature, preferably somewhat above room temperature (20°–25° C.) to hasten the reaction but not above about 150° C. where undesirable reactions occur, in a dry (substantially water-free) environment for the length of time required to react substantially all of the available hydroxyl groups with isocyanate groups. The end-point can be estimated by calculating the amount of free isocyanate that should be present after all of the hydroxyl groups are consumed. As the reaction progresses, samples can be titrated with n-butyl amine to determine the actual isocyanate content, and the reaction can be considered complete when this approaches the estimated value. At the especially convenient temperature of 70°–90° C. this usually requires 1–6 hours. The reaction can be carried out in the absence or presence of solvent. Suitable solvents are, for example, lower ketones such as methyl isobutyl ketone, lower alkyl esters such as ethyl acetate, other volatile polar solvents and mixtures of such materials with hydrocarbons like toluene, mineral spirits, xylene and hexane.

The polyester polymers useful in this invention are prepared by well known esterification or ester interchange reactions between dibasic acids, such as phthalic, adipic, azelaic, maleic or dimerized vegetable oil fatty acids, and polyhydric alcohols, such as ethylene glycol, diethylene glycol, propylene glycol, glycerine, trimethylol ethane or trimethylol propane. Acid anhydrides can be used. The preferred acids are saturated straight chain aliphatic acids like adipic acid. The acid and alcohol components are reacted in such proportions that the resulting polyester polymers contain on the average about 2–3 unreacted hydroxyl groups per molecule. This can be estimated in advance by stoichiometric calculation and can be checked analytically by determining the hydroxyl number and the molecular weight of the polymer and by calculating therefrom the average number of hydroxyl groups per molecule, which is $$\frac{\text{Hydroxyl number} \times \text{molecular weight}}{56,100}$$

"Hydroxyl number" is the number of milligrams of KOH needed to neutralize that amount of acetic acid required to esterify the hydroxyl groups in 1 gram of sample. The range of about 2–3 hydroxyl groups per molecule is critical to the extent that substantially more or less produces undesirable products. Substantially less than 2, for example 1 hydroxyl group per molecule, is not enough to promote the required polymer formation in the subsequent reaction with diisocyanate and in the ultimate drying or curing of the coating. Substantially more than 3, for example 5 or 6 hydroxyl groups per molecule, are too many because the subsequent reaction with diisocyanate produces highly viscous, crosslinked, insoluble or gelled polymers which are not practically usable as high solids content, low viscosity vehicles for paints, enamels or varnishes.

The polyester polymers have a molecular weight of about 500–3000. This can be estimated in advance by stoichiometric calculation and can be determined analytically by the well known method involving boiling point elevation. The range of 500–3000 is very narrow with respect to the wide range of molecular weights known in the polyester or alkyd resin art. The range is critical to the extent that substantially higher or lower molecular weights produce undesirable products. A molecular weight substantially less than 500 for example 200, yields relatively expensive coatings lacking in toughness, durability and resistance to damage from water, oil, soap, solvents and the like. A molecular weight substantially higher than 3000, for example 5000 or 10,000, is too high because the subsequent reaction with diisocyanate is likely to produce highly viscous, insoluble or gelled polymers which are not practically usable in high solids content, readily flowable vehicles for paints, enamels or varnishes. Even the practically usable products from such higher molecular weight polyesters are not entirely satisfactory because of relatively poor abrasion resistance and chemical resistance. The preferred molecular weight is 1000–2500.

The polyester polymers should be as nearly neutral as possible with respect to acidity to prevent free carboxyl groups from interfering with the desired reaction between hydroxyl and isocyanate groups. A maximum acid number of 5 is critical to the extent that polymers having substantially higher acid numbers, such as 10, 25 or 50 do not yield coating compositions having the properties previously described. Such higher acid number polyesters are used as polyurethane foam components. An acid number less than 3 is preferred.

The saturated aliphatic diols useful in this invention are ethylene glycol, propylene glycol, tetramethylene glycol, pentamethylene glycol and hexamethylene glycol. Their presence tends to impart toughness to the ultimate coatings, but not more than one hydroxyl equivalent of such diol is needed for each hydroxyl equivalent of polyester polymer. Tetra- and pentamethylene glycols are preferred.

Examples of the saturated aliphatic triols useful in this invention are glycerine, trimethylol ethane, trimethylol propane and hexanetriol. Their presence encourages crosslinking of the components during drying or curing of the coating and produces hardness and toughness, but more than 6 hydroxyl equivalents of triol for each hydroxyl equivalent of polyester polymer produces a tendency toward unacceptable brittleness in the ultimate coating. The preferred amount of triol is 1.5–4 hydroxyl equivalents for each hydroxyl equivalent of polyester polymer. The preferred triols contain 5–6 carbon atoms, e.g. trimethylol ethane and trimethylol propane.

Examples of the organic diisocyanates useful in this invention are 2,4-tolylene diisocyanate, 2,6-tolylene diisocyanate, 1,3-phenylene diisocyanate, methylene bis (4-phenyl isocyanate), 4-chloro-1,3-phenylene diisocyanate, 1,5-naphthalene diisocyanate, 4,4'-biphenylene diisocyanate, 1,4-tetramethylene diisocyanate, 1,6-hexamethylene diisocyanate, 1,10-decamethylene diisocyanate, 1,4-cyclohexylene diisocyanate, methylene bis (4-cyclohexyl isocyanate) and 1,5-tetrahydronaphthalene diisocyanate. The arylene diisocyanates, i.e. those in which the isocyanate groups are attached to an aromatic ring, are preferred. A particularly preferred species is 2,4-tolylene diisocyanate.

The diisocyanates are used in such proportions that they provide at least 1.2 isocyanate groups for each hydroxyl group provided by the hydroxyl-containing components previously described. Substantially less than this amount leads to gellation during preparation of the coating composition or lack of the required storage stability. Using more than 2 isocyanate groups for each hydroxyl group provided by the hydroxyl-containing components leads to high cost (without compensatory improvements), poor resistance to yellowing of the coatings during service, and a toxicity problem due to the presence of free diisocyanate. The preferred number of isocyanate groups for each hydroxyl group is at least 1.6.

The presence of at least 0.003% by weight of chlorine, based on the weight of the organic diisocyanate, in the form of a compound which produces chloride ions in water and is acidic in water is critical to the extent that the absence of chlorine or the presence of substantially less than 0.003% yields insoluble or gelled polymers or coating compositions which are not storage-stable. This is particularly the case when ordinary commercial grades of the various polyhydroxy components previously described are used. In general, the more nearly chemically pure the polyhydroxy components are, the less chlorine is needed; but it has been found that the 0.003% mentioned above is a minimum for practical and economical commercial operations. A practical maximum chlorine content is 0.02% by weight based on the weight of the organic diisocyanate. A preferred range is 0.01%–0.02%.

Examples of suitable chlorine compounds are carbamyl chlorides, acyl chlorides, hydrogen chloride, phosgene, benzoyl chloride and o-chlorobenzoyl chloride. A preferred method of adding the chlorine compound is in admixture with the organic diisocyanate. Chlorine sometimes occurs as an impurity in certain commercial grades of organic diisocyanates. It is believed to exist therein as a carbamyl chloride. The chlorine content of a commercial diisocyanate can be increased, for example, by adding thereto dry hydrogen chloride or another compound mentioned above and can be decreased, for example, by distillation or by blending with a diisocyanate containing less or no chlorine. The chlorine content of a diisocyanate can be determined by reacting the diisocyanate with a large excess of an alcohol, e.g. analytical grade isopropanol, acidifying with dilute nitric acid and titrating ionic chlorine (chloride) potentiometrically with silver nitrate solution.

The coating compositions of this invention can be pigmented for reinforcing, coloring or hiding purposes. They can also be prepared as clear coating compositions without pigment. Suitable pigments include metal oxides, sulfides, sulfates, silicates and chromates, metal powder or flake, carbon black, iron blues, and organic dyestuffs and lakes thereof. Other common additives for liquid organic coating compositions can also be used, such as hardeners, softeners, catalysts and surface active agents.

Since the curing of the polyurethane polymers described herein is effected by reaction with water and this reaction is to be avoided until the coating compositions are applied to the desired substrate, water should be excluded or limited to an innocuous amount during the preparation and storage of the products of this invention.

It is to be understood that the air-drying of the products of this invention is not limited to normal atmospheric temperatures. Drying can be hastened by force-drying or baking at elevated temperatures, which are preferably between 100° and 200° F. When the water content of the atmosphere is low, drying can be hastened by increasing the humidity, such as by introducing steam.

The following examples illustrate the principles and practice of this invention, but the scope of the invention is not limited by these specific examples. Unless otherwise indicated the parts and percentages are given by weight. In all instances, the chlorine content given is that amount determined by the previously described analytical procedure. The percentage is based on the weight of the diisocyanate.

*Example 1*

| | Parts by weight |
|---|---|
| Polyester polymer A | 165.5 |
| Trimethylol ethane | 48.0 |
| Methyl isobutyl ketone solvent | 222.2 |
| Tolylene diisocyanate (80% 2,4-; 20% 2,6-), chlorine 0.01% | 187.7 |

Polyester polymer A contains the interesterification residues of about 13 mols of adipic acid, 13 mols of diethylene glycol and 1 mol of trimethylol propane. Molecular weight about 1850, acid number 2.6, hydroxyl number 65.2, hydroxyl groups per molecule about 2.3.

The reactants in this charge are present in amounts providing approximately the following relative proportions: 1 hydroxyl equivalent of polyester, 6 hydroxyl equivalents of triol (trimethylol ethane) and 1.5 isocyanate groups for each hydroxyl group.

The polyurethane reaction product is obtained by charging the first three ingredients into closed vessel equipped with a thermometer, an agitator, a reflux condenser with take-off head and water trap, and a "Drierite" desiccant-filled vent to the atmosphere.

Since the solvent is known to contain a small amount of water, the first three ingredients of the charge are heated to about 120° C. and 50 parts by weight of solvent are distilled off to remove substantially all of the water.

The dried intermediate is cooled to room temperature, and the tolylene diisocyanate is then added. The resulting charge is heated at about 80° C. for about 3 hours. The resulting polyurethane solution has a viscosity of about U (Gardner-Holdt) at a solids contents of about 70%.

The product is stable and does not change materially in viscosity during storage in a closed full can.

The product is thinned with xylene and applied to a wood floor by brushing a thin coating thereon. The coating is dry and hard after drying overnight in air at normal room temperature, relative humidity 50%.

Example 2

| | Parts by weight |
|---|---|
| Polyester polymer B | 90.7 |
| Trimethylol propane | 18.4 |
| 2,4-tolylene diisocyanate with dry HCl added to chlorine content of 0.02% | 91.0 |

Polyester polymer B contains the interesterification residues of about 9 mols of dicarboxylic acid mixture resulting from the dimerization of predominately $C_{18}$ unsaturated monobasic acids from vegetable oil (Emery 3065S), 10 mols of diethylene glycol, and 1 mol of trimethylol ethane. Molecular weight about 2075, acid number 2.56, hydroxyl number 66.3, hydroxyl groups per molecule about 2.5.

The reactants are present in amounts providing approximately the following relative proportions: 1 hydroxyl equivalent of polyester, 3.7 hydroxyl equivalents of triol (trimethylol propane) and 2 isocyanate groups for each hydroxyl group.

The polyurethane reaction product is obtained by heating the mixed ingredients for about 3 hours at about 80° C. in a closed vessel containing an atmosphere of dry nitrogen and having a thermometer, an agitator and a desiccant-filled vent to the atmosphere.

A portion of the product is dissolved in twice its weight of methyl isobutyl ketone. The resulting solution is sprayed on wood to form a clear coating which dries hard in air at normal room temperature and about 70% relative humidity. The solution is stable during storage.

Example 3

A pigmented coating composition of this invention is made by grinding the following components together in conventional paint grinding apparatus until a smooth dispersion is produced.

| | Parts by weight |
|---|---|
| Polyurethane product of Example 2 (no solvent) | 70 |
| Pigment slurry | 96 |

The pigment slurry is prepared as a means of dehydrating both pigment and solvent by distillation. 500 parts by weight of titanium dioxide is slurried with 400 parts of methyl isobutyl ketone. The mixture is heated to 115°–120° C. in a reaction vessel equipped with a reflux condenser having a water trap. 41 parts of distillate containing substantially all of the water in the slurry is removed and discarded.

The resulting pigmented product is thinned to spraying viscosity with a mixture of methyl isobutyl ketone and toluene and is sprayed on a metal article to provide a coating about 2 mils thick when dry. The wet coating dries hard by solvent evaporation and reaction of the polyurethane polymer with atmospheric moisture.

Other conventional paint pigments can be substituted for all or part of the titanium dioxide used in this example.

Example 4

| | Parts by weight |
|---|---|
| Polyester polymer C solutions: | |
|    Polyester polymer C solids | 90.0 |
|    Xylene | 10.0 |
| Pentane diol | 8.4 |
| Trimethylol propane | 21.7 |
| N,N-dimethyl cyclohexyl amine catalyst | 0.2 |
| Tolylene diisocyanate (80% 2,4-, 20% 2,6-,) chlorine 0.02% | 112.6 |
| Methyl isobutyl ketone (anhydrous) | 104.0 |

Polyester polymer C contains the interesterification residues of about 5 mols of adipic acid and 6 mols of propylene glycol. Molecular weight about 1100, acid number 0.05, hydroxyl number 101, hydroxyl groups per molecule about 2.

The reactants in this charge are present in amounts providing approximately the following relative proportions: 1 hydroxyl equivalent of polyester, 1 hydroxyl equivalent of diol, 3 hydroxyl equivalents of triol and 1.6 isocyanate groups for each hydroxyl group.

The polyurethane reaction product is obtained by charging the first four ingredients into a closed reactor (equipped with a thermometer, an agitator, a reflux condenser and a desiccant-filled vent to atmosphere), heating to about 35° C., adding the diisocyanate whereupon the temperature rises in about 5 minutes to 135° C., cooling by an exterior water spray to 95° C., adding the methyl isobutyl ketone, and continuing the heating at 80°–90° C. for 3.5 hours.

The product is stable during storage. A coating prepared by flowing a small amount of the product on a glass panel dried tack-free in 3–4 hours in air at 75° F. and 50% relative humidity. The coating was hard, tough and wear resistant after a total drying time of about 16 hours.

The product dried satisfactorily in air at 9% relative humidity, but it took somewhat longer to reach the tack-free and hard dry stages respectively.

Example 5

Example 4 is repeated omitting the catalyst. The temperature rise to 135° C. does not occur upon addition of the diisocyanate. The product is similar in all respects to the product of Example 4 except for being slower in drying speed.

Example 6

| | Parts by weight |
|---|---|
| Polyester polymer D | 200.0 |
| Xylene | 20.0 |
| Tolylene diisocyanate (80% 2,4-; 20% 2,6-), chlorine 0.02% | 25.9 |

Polyester polymer D contains the interesterification residues of 4.32 mols of the dimer acids described in Example 2 and 5.19 mols of diethylene glycol. Molecular weight about 2700, acid number 1.75, hydroxyl number 40.1, hydroxyl groups per molecule about 2.

The diisocyanate is present in an amount providing about 2 isocyanate groups for each hydroxyl group.

The polyurethane reaction product is obtained by heating the three ingredients at about 90° C. for about 3 hours in a closed reactor equipped with a thermometer, an agitator, a reflux condenser and a desiccant-filled vent to the atmosphere. Upon cooling to room temperature, the charge is cut to about 50% solids by adding 205 parts of xylene.

The product is stable and does not change materially in viscosity during prolonged storage in a closed full can. Coatings thereof dry rapidly in air under normal temperature and humidity conditions.

The remaining examples provide the essential information on several additional polyurethane reaction products, all of which are useful as a film-forming component in clear or pigmented coating compositions. All are stable during storage. All dry to hard tough coatings when thin liquid coatings thereof are exposed to air.

*Example 7*

| Charge: | Parts by weight |
|---|---|
| Polyester polymer (14.33 mols adipic acid, 14.33 mols 1,4-butane diol, 1 mol trimethylol propane; mol. wt. about 2875, acid No. 0.45, hydroxyl No. 58.2, about 3 hydroxyl groups per molecule) | 191.8 |
| Ethylene glycol | 3.1 |
| Methyl isobutyl ketone | 100.0 |
| Methylene bis (4-phenyl isocyanate) chlorine content 0.02% | 74.5 |

Proportions:
Polyester—1 hydroxyl equivalent
Diol—0.5 hydroxyl equivalent
Diisocyanate—2 isocyanate groups per hydroxyl group Polyurethane reaction product prepared as in Example 1.

*Example 8*

| Charge: | Parts by weight |
|---|---|
| Polyester polymer A (of Example 1) | 165.50 |
| Ethylene glycol | 0.62 |
| Glycerol | 0.92 |
| N,N-dimethyl dodecyl amine catalyst | 1.00 |
| Methyl isobutyl ketone (anhydrous) | 121.00 |
| Hexamethylene diisocyanate, chlorine content 0.01% | 40.30 |

Proportions:
Polyester—1 hydroxyl equivalent
Diol—0.1 hydroxyl equivalent
Triol—0.15 hydroxyl equivalent
Diisocyanate—1.92 isocyanate groups per hydroxyl group Polyurethane reaction product prepared as in Example 4.

NOTE.—An analogous product made on this formula, but using a hexamethylene diisocyanate having a chlorine analysis of 0.000%, thus not being a part of this invention, gels in the reaction vessel after 25 minutes of heating at 80° C. The gel is not useful as a film-forming material in coating compositions of the character involved in this invention.

*Example 9*

| Charge: | Parts by weight |
|---|---|
| Polyester polymer (10 mols adipic acid, 8.75 mols ethylene glycol, 2.19 mols propylene glycol; mol. wt. about 2250, acid No. 1.25, hydroxyl No. 49.7, about 2 hydroxyl groups per molecule) | 200.0 |

| Charge: | Parts by weight |
|---|---|
| Trimethylol propane | 24.0 |
| Tolylene diisocyanate (80% 2,4-; 20% 2,6-), chlorine 0.02% | 125.3 |

Proportions:
Polyester—1 hydroxyl equivalent
Triol—3 hydroxyl equivalents
Diisocyanate—2 isocyanate groups per hydroxyl group Polyurethane reaction product prepared as in Example 2.

Many widely different embodiments of this invention can be made, in the light of the teachings herein, in addition to those described in the specific examples. Therefore the invention is not intended to be limited except as indicated in the appended claim.

I claim:

A stable, air-drying liquid organic coating composition prepared by mixing under substantially anhydrous conditions (a) 100 parts by weight of a polyester polymer solution, said solution consisting essentially of 10 parts by weight of xylene and 90 parts by weight of a polyester polymer having a molecular weight of about 1100, an acid number of about 0.05, a hydroxyl number of about 101 and containing an average of about 2 hydroxyl groups per molecule, (b) 8.4 parts by weight of pentane diol, (c) 21.7 parts by weight of trimethylol propane and (d) 0.2 parts by weight of N,N-dimethyl cyclohexyl amine; heating said mixture to a temperature of about 35° C.; adding to said heated mixture 112.6 parts by weight of a tolylene diisocyanate isomeric composition whereby the temperature of said mixture upon the addition of said tolylene diisocyanate isomeric composition rises to about 135° C., said isomeric composition consisting of 80 percent by weight of 2,4-tolylene diisocyanate and 20 percent by weight of 2,6-tolylene diisocyanate and containing 0.02 percent by weight based on the weight of said diisocyanate of chlorine; cooling the resulting mixture to about 95° C.; adding thereto 104 parts by weight of anhydrous methyl isobutyl ketone followed by heating at 80–90° C. for 3.5 hours.

References Cited in the file of this patent

UNITED STATES PATENTS

| 2,620,349 | Slocombe | Dec. 2, 1952 |
| 2,650,212 | Windemuth | Aug. 25, 1953 |
| 2,692,873 | Langerak et al. | Oct. 26, 1954 |
| 2,692,874 | Langerak | Oct. 26, 1954 |
| 2,729,618 | Muller et al. | Jan. 3, 1956 |
| 2,836,575 | Jones et al. | May 27, 1958 |
| 2,855,421 | Bunge et al. | Oct. 7, 1958 |

FOREIGN PATENTS

| 929,507 | Germany | June 27, 1955 |